United States Patent
Balaschak

(10) Patent No.: US 10,814,454 B2
(45) Date of Patent: Oct. 27, 2020

(54) TOOL GUIDE FOR TIE BAR REMOVAL FROM CASTING CORES

(71) Applicant: General Electric Company, Schenectady, NY (US)

(72) Inventor: Edward James Balaschak, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 141 days.

(21) Appl. No.: 15/988,332

(22) Filed: May 24, 2018

(65) Prior Publication Data

US 2019/0358766 A1    Nov. 28, 2019

(51) Int. Cl.
| | |
|---|---|
| B24B 19/14 | (2006.01) |
| B28B 11/14 | (2006.01) |
| B22C 9/10 | (2006.01) |
| B28B 7/00 | (2006.01) |
| B23C 3/12 | (2006.01) |
| B23Q 9/00 | (2006.01) |
| C04B 41/00 | (2006.01) |

(52) U.S. Cl.
CPC .............. *B24B 19/14* (2013.01); *B22C 9/10* (2013.01); *B23C 3/12* (2013.01); *B23Q 9/0071* (2013.01); *B28B 7/0061* (2013.01); *B28B 11/14* (2013.01); *B23C 2220/40* (2013.01); *C04B 41/009* (2013.01); *C04B 41/0036* (2013.01); *Y10T 409/306496* (2015.01)

(58) Field of Classification Search
CPC ......... B24B 19/14; B22C 9/10; B28B 7/0061; B28B 11/14; C04B 41/36; B23B 47/28; Y10T 408/567
USPC ................................................ 29/244; 408/1
See application file for complete search history.

(56) References Cited

U.S. PATENT DOCUMENTS

| | | | |
|---|---|---|---|
| 5,299,894 A * | 4/1994 | McCowin | ............... B23B 47/28 408/1 R |
| 5,465,780 A | 11/1995 | Muntner et al. | |
| 6,546,991 B2 | 4/2003 | Dworog et al. | |
| 8,360,106 B2 | 1/2013 | Harper | |
| 8,490,673 B2 | 7/2013 | Defrocourt et al. | |
| 2015/0266086 A1 | 9/2015 | Stone et al. | |

* cited by examiner

*Primary Examiner* — Monica S Carter
*Assistant Examiner* — Alberto Saenz
(74) *Attorney, Agent, or Firm* — Hoffman Warnick LLC

(57) ABSTRACT

This disclosure relates to a tool guide for a tool that shapes a workpiece. The tool guide may include a body having a contact surface configured to contact a surface of a workpiece, a tool holder positioned within the body and configured to hold a machining tool having a tool bit, the tool holder holding the machining tool in a predetermined orientation relative to the workpiece, a guide element attached to the body configured to engage a surface feature of the workpiece, and an upper opening and a lower opening in the body configured to allow the tool bit to extend beyond the contact surface and operate to remove a portion of the workpiece.

20 Claims, 8 Drawing Sheets

TOOL GUIDE FOR TIE BAR REMOVAL FROM CASTING CORES

BACKGROUND

Technical Field

The present disclosure relates to investment casting, or more particularly, to guides for tools for shaping cores for casting components.

Related Art

Investment casting is used to manufacture a large variety of industrial parts such as turbomachine blades. Investment casting uses a casting article having a sacrificial material pattern to form a ceramic mold for the investment casting. Certain types of casting articles may include a ceramic core or insert within the sacrificial material pattern. The ceramic core is used to create a hollow structure in a final product, and may define an interior structure of the component. The ceramic core is a part of the ceramic mold used during the investment casting. Ceramic core(s) can include a large variety of intricate surface features that define an interior structure of the component, e.g., a number of cooling passages within a turbomachine blade. Ceramic cores can be cast, or additively manufactured to allow for rapid prototyping and manufacturing of the cores. The casting article is made by molding a sacrificial material fluid, such as hot wax or a polymer, about the ceramic core while it is positioned in a ceramic mold that defines the shape of the component surrounding the ceramic core. The hardened sacrificial material formed about the ceramic core defines the shape of the component for the investment casting. Each casting article, either individually or in a collection thereof, can be dipped in a slurry to be coated with a ceramic to form a ceramic mold for the investment casting. Once the sacrificial material is removed from the ceramic mold, the ceramic mold with the ceramic core therein can be used to investment cast the component using a molten metal, e.g., after pre-heating the ceramic mold. Once the molten metal has hardened, the ceramic mold can be removed, and the ceramic core can be removed using a leachant. The component can then be finished in a conventional fashion, e.g., heat treating and conventional finishing.

Investment casting is a time consuming and expensive process, especially where the component must be manufactured to precise dimensions. In particular, where precise dimensions are required, formation of the casting article must be very precise. Each mold used to form the casting article can be very costly, and can take an extensive amount of time to manufacture. Consequently, any changes or flaws in the ceramic core or the component can be very expensive and very time consuming to address.

The intricate structural surface features of a ceramic core may require that temporary elements be included during manufacturing to provide support for other elements. For example, cores designed to form multiple or serpentine cooling channels in a finished component may require temporary elements such as tie-bars that connect different portions of the core in order to stabilize the core during intermediate processing steps. However, these temporary elements must be removed before the core is included in the casting article. Casting cores are often produced in various custom shapes tailored to specific turbomachine blade designs. Production batches are often small and the potential to use automated techniques such as computer numerical control (CNC) machining is limited due to distortions introduced during the firing process.

Removing the temporary elements may be accomplished using manually controlled rotary cutting and grinding tools. One challenge with this process is ensuring that the temporary elements are completely removed without damaging the exterior surface of the core. This process currently requires a high degree of skill on the part of a machinist, as even minor damage to the core may render it unsuitable for use in subsequent steps of the investment casting process. A damaged core may need to be discarded or the exterior surface thereof subjected to extensive, labor-intensive rework. The rework may be very difficult depending on the size and intricacy of the exterior surface structure.

SUMMARY

A first aspect of the disclosure is directed to a tool guide for a tool that shapes a workpiece, the tool guide including: a body having a contact surface configured to contact a surface of a workpiece; a tool holder positioned within the body and configured to hold a machining tool having a tool bit, the tool holder holding the machining tool in a predetermined orientation relative to the workpiece; a guide element attached to the body configured to slidably engage a surface feature of the workpiece; and an upper opening and a lower opening in the body configured to allow the tool bit to extend beyond the contact surface and operate to remove a portion of the workpiece.

A second aspect of the disclosure is directed to a tool guide for a tool that shapes a workpiece, the tool guide including: a body having a contact surface configured to contact a surface of a workpiece; a positioning element attached to the body configured to removably engage a surface feature of the workpiece; and an upper opening and a lower opening in the body configured to limit the movement of a machining tool having a tool bit to a predetermined area and configured to allow the tool bit to extend beyond the contact surface and operate to remove a portion of the workpiece.

A third aspect of the disclosure is directed to a tool guide for a tool that shapes a workpiece, the tool guide including: a body having a contact surface configured to contact a surface of a workpiece; a first positioning element attached to the body configured to removably engage a surface feature of the workpiece; a second positioning element attached to the body configured to removably engage a surface feature of the workpiece; an upper opening and a lower opening in the body configured to limit the movement of a machining tool having a tool bit to a predetermined area and configured to allow the tool bit to extend beyond the contact surface and operate to remove a portion of the workpiece; and a liner positioned within the lower opening wherein the liner includes a liner material having greater resistance to wear than the body, wherein the contact surface and the positioning element are each shaped to substantially conform to a predetermined portion of the workpiece.

The foregoing and other surface features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific representative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Unless otherwise noted, the terms "bottom" or "lower" refer to the portion of the tool guide oriented towards the casting core during use, regardless of the orientation of the casting core. Likewise, the terms "top" or "upper" refer to the portion of the tool guide oriented opposite the direction of the casting core during use regardless of the orientation of the casting core.

Embodiments of this disclosure include tool guides configured to hold a manually-operated machining tool, such as a cutting or grinding tool. The tool guide operates to position the machining tool and tool bit in an orientation relative to a casting core which allows the tool bit to remove temporary elements such as tie-bars without damaging other portions of the casting core.

Figure 1:
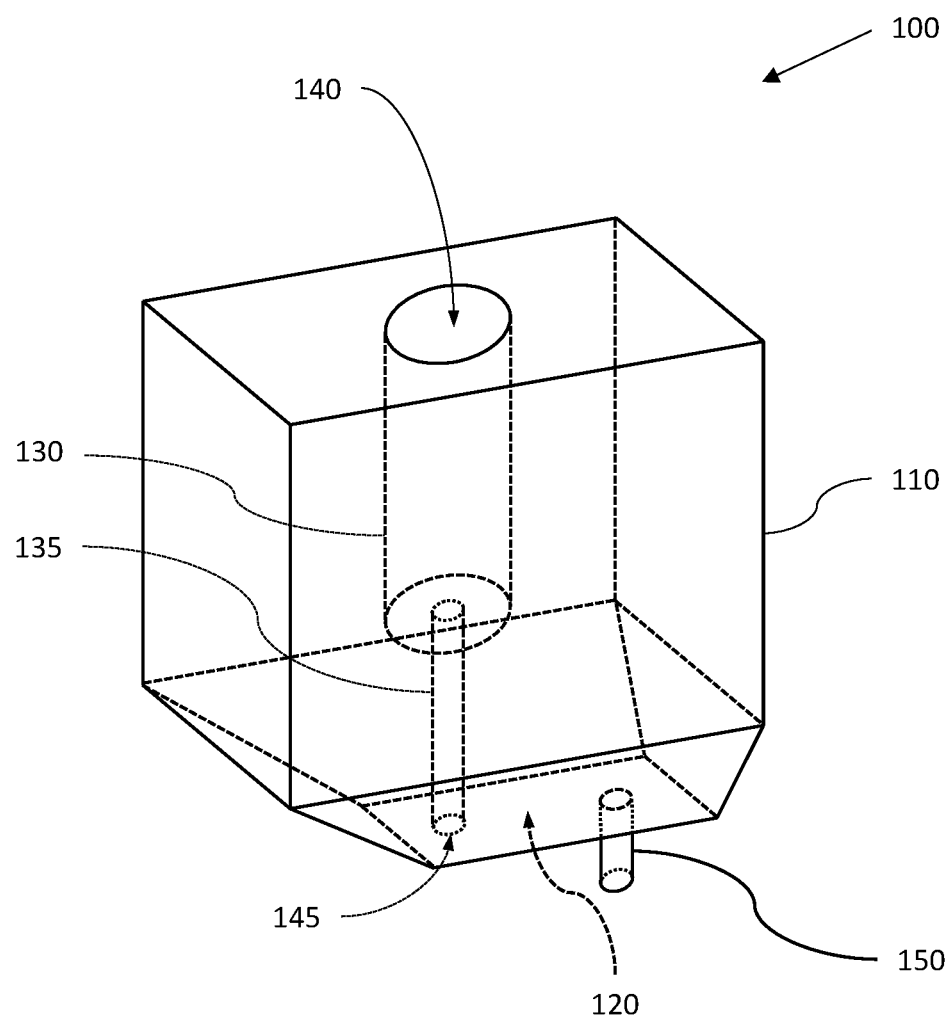
FIG. 1 shows a perspective view of a tool guide according to embodiments of this disclosure.

FIG. 1 shows a perspective view of an example of an embodiment according to this disclosure. A tool guide 100 according to this disclosure may include a body 110 which has a contact surface 120 located on the bottom of the body. Contact surface 120 may be planar or be shaped to match a portion of a particular casting core design. Contact surface 120 may include one or more geometric elements, e.g., convex curvature, concave curvature, grooves, ridges, or other geometry complementary to the surface of a casting core. Body 110 may also include a tool holder 130 and an upper opening 140 configured to accept a machining tool. Body 110 may also include a bit channel 135 connecting tool holder 130 to a lower opening 145 in contact surface 120 that is configured to allow a tool bit attached to the machining tool to extend outwards from contact surface 120. The tool bit may include, e.g., a rotary cutter, grinder, drill bit, milling bit, hydraulic jet cutter, laser cutter, or other mechanism now known or later developed to remove material from a casting core. At least one guide element 150 may also be attached to and extend outwards from contact surface 120. Guide element 150 may be shaped to engage a surface feature, e.g., a slot, edge, recess, protrusion, and/or other portion of the casting core to slide along the casting core. Guide element 150 may have the shape of, e.g., a pin, cylinder, rectangular fin, triangular fin, rounded tab, or other shape capable of sliding along a surface feature of the casting core.

While body 110 and contact surface 120 as shown in FIG. 1 are generally rectangular, it should be understood that various embodiments may include a body 110 or contact surface 120 of any other shape. Likewise, tool holder 130 shown as generally cylindrical and upper opening 140 are shown as generally circular in FIG. 1 for illustrative purposes, but may be of any shape that will hold the machining tool to be used with tool guide 100 in the desired orientation relative to the casting core.

Body 110 may be composed of one or more of a variety of materials, which may include, e.g., polymer resins, ceramics, or metals. In some embodiments, the material used to form body 110 may be at least partially transparent. Using a partially transparent material for all or part of tool guide 100 enables the machinist to visually observe the tool bit during removal of material from the casting core. Visual observation assists the machinist in directing the machining tool/tool guide combination while avoiding damage to the casting core. Partially transparent materials may also be used for other components.

Figure 2:
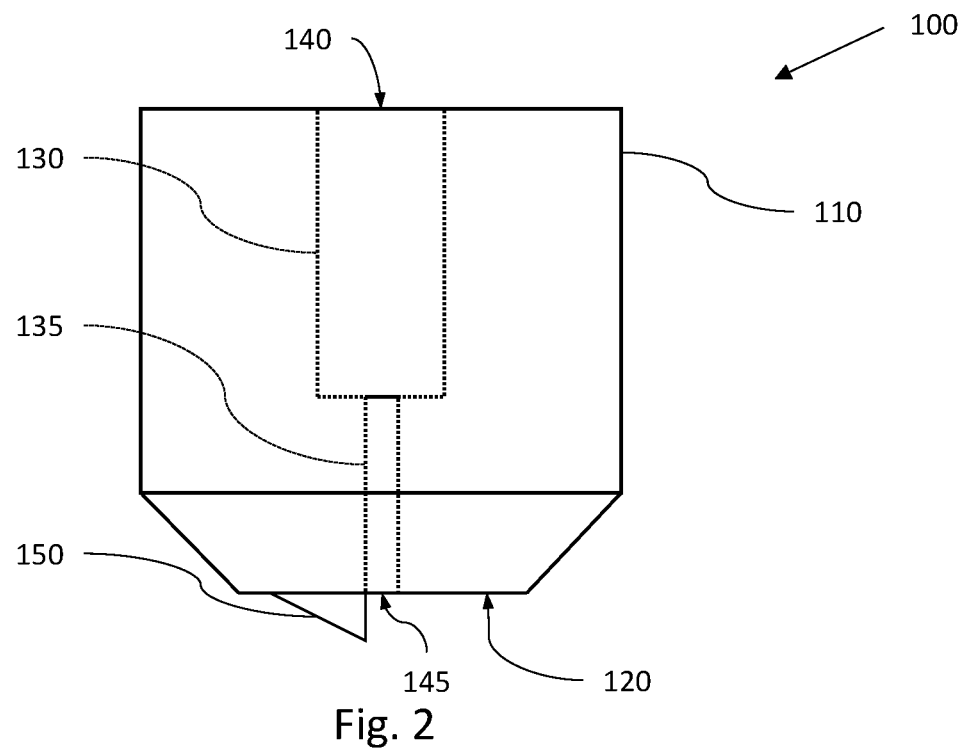
FIG. 2 shows a side elevation view of a tool guide according to embodiments of this disclosure.
Figure 3:
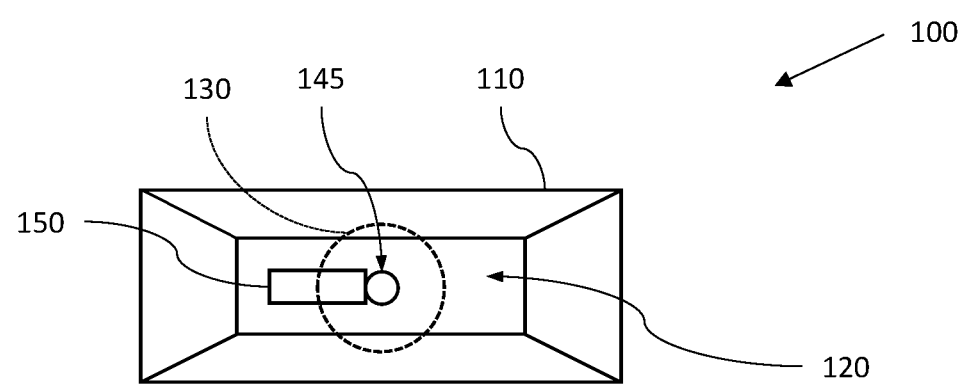
FIG. 3 shows a bottom view of the tool guide in FIG. 2 according to embodiments of this disclosure.

FIG. 2 and FIG. 3 together show two views of another embodiment according to this disclosure. FIG. 2 shows a side view of an embodiment, and FIG. 3 shows a bottom view of the same embodiment. Here, tool guide 100 includes a body 110, contact surface 120, tool holder 130, bit channel 135, upper opening 140, and lower opening 145 as described above regarding FIG. 1. Tool guide 100 also includes a guide element 150 having a generally triangular fin shape located at an alternate position than shown in FIG. 1 relative to lower opening 145 and contact surface 120. It should be understood that guide element 150 may be positioned at any location on body 110, including on contact surface 120, and in any orientation that allows tool guide 100 to slide along the casting core while maintaining the proper orientation of the machining tool and tool bit.

Figure 4:
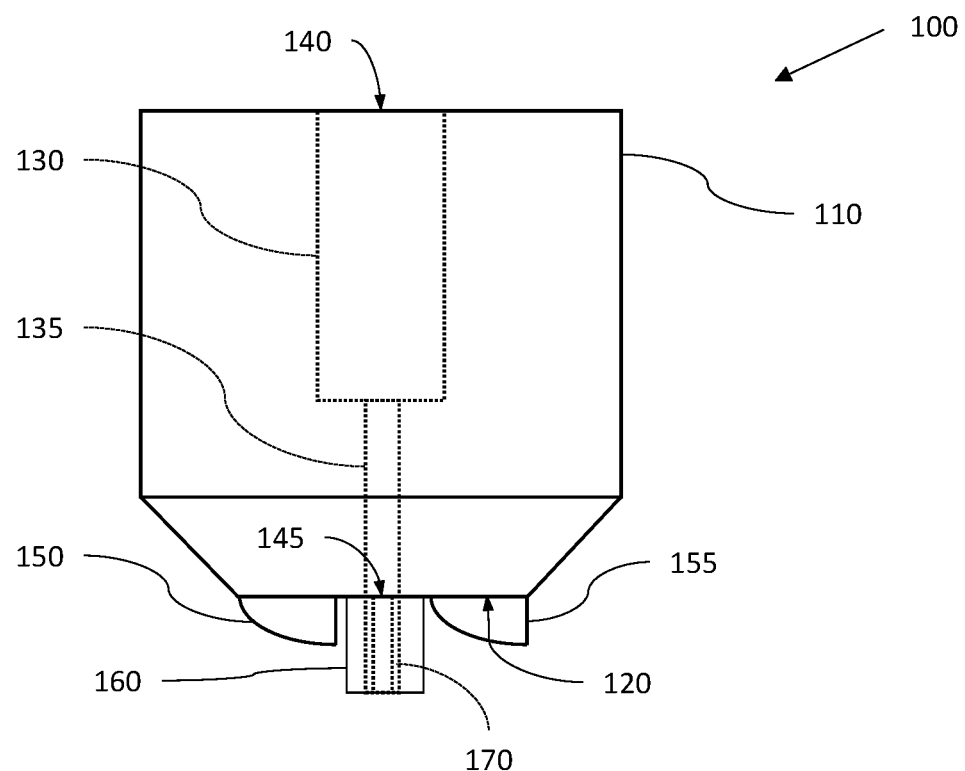
FIG. 4 shows a side elevation view of a tool guide according to embodiments of this disclosure.
Figure 5:
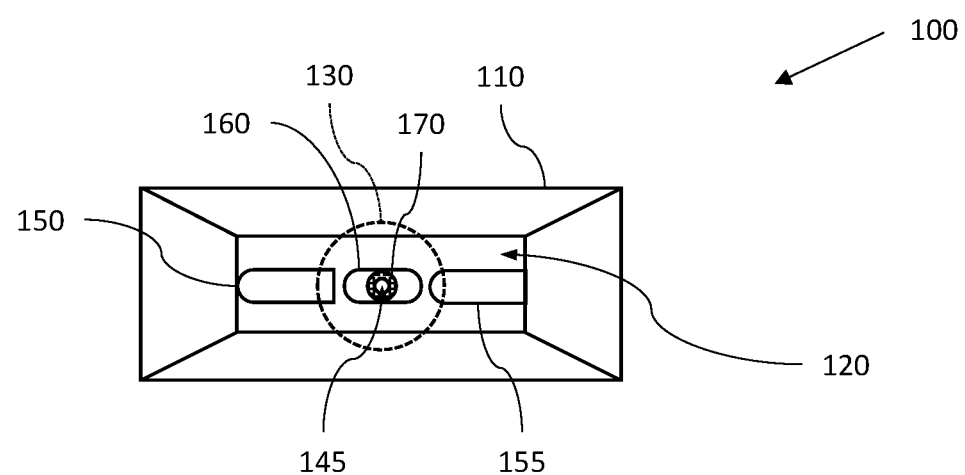
FIG. 5 shows a bottom view of the tool guide in FIG. 4 according to embodiments of this disclosure.

FIG. 4 and FIG. 5 together show two views of another embodiment according to this disclosure. FIG. 4 shows a side view of an embodiment, and FIG. 5 shows a bottom view of the same embodiment. Here, tool guide 100 includes body 110, contact surface 120, tool holder 130, bit channel 135, upper opening 140, and lower opening 145 as described above regarding FIGS. 1-3. Tool guide 100 also includes a guide element 150 and a second guide element 155 each having a rounded fin shape and located on contact surface 120. It should be understood that any number of guide elements may be included. Additionally, tool guide 100 in FIGS. 4 and 5 may include a bit guard 160 and a liner 170 surrounding lower opening 145.

Bit guard 160 provides additional protection for the surface of the casting core as the temporary elements are removed by enclosing part of the machining tool bit. It may extend along the full length of the tool bit, thereby allowing only the sides of the tool bit to contact the casting core. Alternatively, it may extend only partially along the length of the tool bit, thereby allowing the tip or both the tip and sides of the tool bit to contact the casting core. A liner 170 may be included inside one or more of lower opening 145, bit guard 160, or bit channel 135. Optional liner 170 protects the other components of tool guide 100 from abrasion or other damage from the tool bit, both during assembly of the machining tool/tool guide combination and during operation of the machining tool. Liner 170 may be shaped to conform to all or part of the inner surface of bit channel 135 and/or bit guard 160, e.g., as a cylindrical sleeve. Liner 170 may be composed of any material having a greater resistance to wear than other components of tool guide 100 which may come in contact with the tool bit, such as the body, bit channel, and/or bit guard. Materials that may be used for liner 170 include, e.g., polymer resins, ceramics, or metals.

Different portions of tool guide 100 may be combined into integral units. For example, body 110, bit guard 160, and guide element(s) 150 may be manufactured as a single unit from the same material. Likewise, body 110 and bit guard 160, bit guard 160 and guide elements(s) 150, or body 110 and guide elements 150 may be manufactured as a single unit from the same material. Individual parts or all of tool guide 100 may be manufactured using additive manufacturing. Additive manufacturing could facilitate customization of, e.g., contact surface 120 and/or guide elements 150, 155 as desired.

Figure 6:
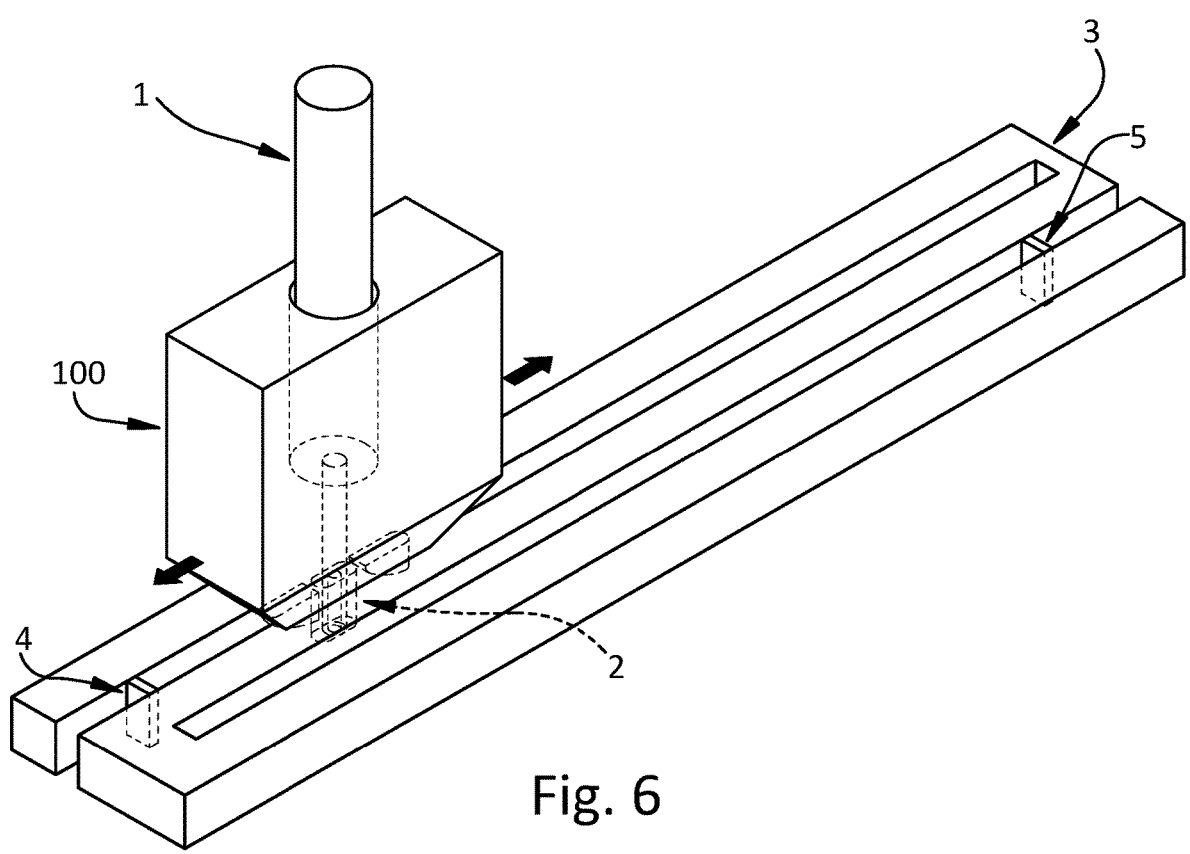
FIG. 6 shows a tool guide according to embodiments of this disclosure employed in conjunction with a machining tool and casting core.

FIG. 6 shows a tool guide 100 according to embodiments of this disclosure employed in conjunction with a machining tool 1, tool bit 2, and workpiece 3, e.g., a casting core. Machining tool 1 is mounted in tool guide 100 with tool bit 2 attached to machining tool 1 and extending outwards towards workpiece 3. Tool guide 100 may then be slid along a surface of workpiece 3 so as to cause tool bit 2 to remove temporary tie-bar 4. It will be apparent to those of ordinary skill in the art that tool guide 100 may be employed to aid in shaping many other workpieces without departing from the scope and spirit of the disclosure. It will therefore also be apparent to those of ordinary skill in the art that tool guide 100 may be employed in fabricating any casting core used in investment casting processes without departing from the scope and spirit of the disclosure, and that a turbomachine blade casting core is shown for purposes of illustration and description, but is not intended to be exhaustive or limiting to the disclosure in the form disclosed. Likewise, any number of additional temporary elements such as second tie bar 5 may be removed using embodiments of this disclosure. Tie bar 4 and second tie bar 5 are shown for purposes of illustration and description, but are not intended to be exhaustive or limiting to the disclosure.

Embodiments of the present disclosure may also include tool guides configured to engage with fixed portions of the casting core during machining and be removed afterwards. By using different embodiments of tool guides according to this disclosure, multiple temporary elements located at multiple places on the casting core could be machined at the same time.

Figure 7:
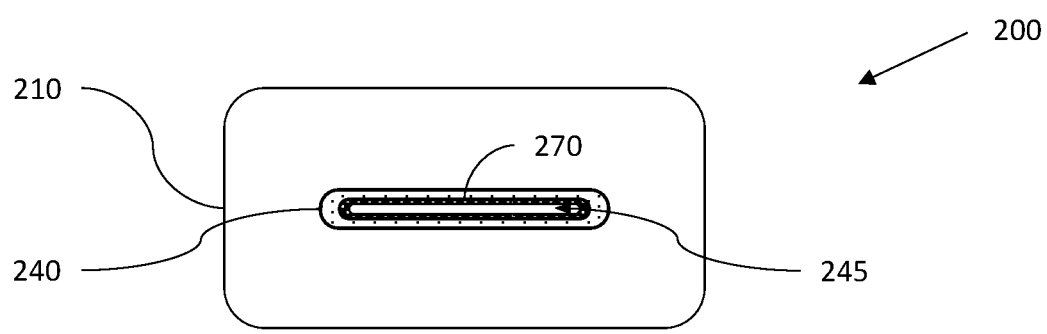
FIG. 7 shows a top view of a tool guide according to embodiments of this disclosure.
Figure 8:
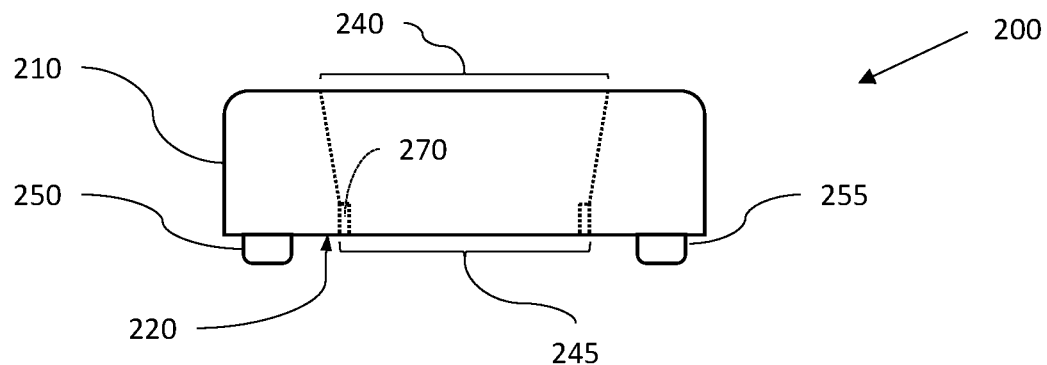
FIG. 8 shows a side elevation view of the tool guide in FIG. 6 according to embodiments of this disclosure.
Figure 9:
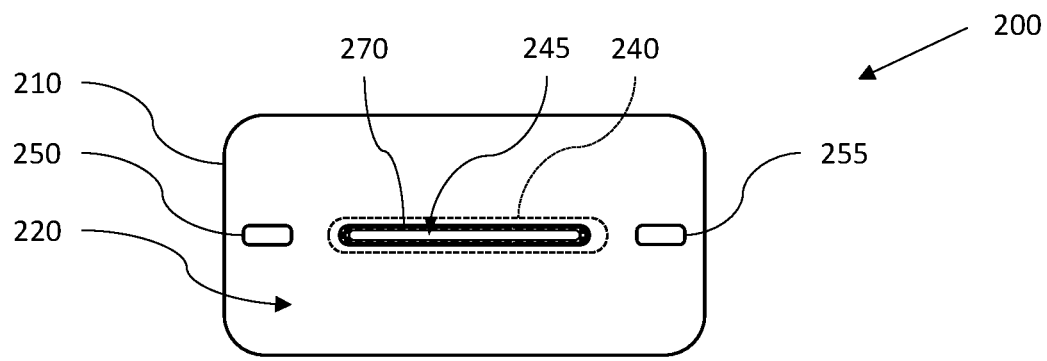
FIG. 9 shows a bottom view of the tool guide in FIG. 6 and FIG. 7 according to embodiments of this disclosure.

FIGS. 7, 8, and 9 together show several views of an embodiment according to this disclosure. FIG. 7 shows a top view of an embodiment, FIG. 8 shows a side view of the same embodiment, and FIG. 9 shows a bottom view of the same embodiment. A tool guide 200 according to this disclosure may include a body 210 which has a contact surface 220 located on the body. Contact surface 220 may be planar or be shaped to match a portion of a particular casting core design. Contact surface 220 may include one or more geometric elements, e.g., convex curvature, concave curvature, grooves, ridges, or other geometry complementary to the surface of a casting core. Body 210 may also include an upper opening 240 configured to contact a machining tool and a lower opening 245 in contact surface 220 configured to allow a tool bit attached to the machining tool to extend outwards from contact surface 220. The tool bit may include, e.g., a rotary cutter, grinder, drill bit, milling bit, hydraulic jet cutter, laser cutter, or other mechanism now known or later developed to remove material from a casting core. At least one positioning element 250, 255 may also be attached to and extend outwards from contact surface 220. It should be understood that any number of positioning elements may be included. Each positioning element 250, 255 may be shaped to engage a surface feature, e.g., a slot, edge, recess, protrusion, and/or other portion of the casting core, or multiple surface features, and thereby fix tool guide 200 in a predetermined location and predetermined orientation with respect to a portion of the casting core. The positioning element may have the shape of, e.g., a pin, cylinder, rectangular fin, triangular fin, rounded tab, curved tab, or other shape capable of engaging with a surface feature of the casting core. The shape and position of positioning elements 250, 255 is chosen to complement a portion of the casting core and hold tool guide 200 in place during machining.

While body 210 and contact surface 220 as shown in FIGS. 7-9 are generally rectangular, it should be understood that various embodiments may include a body 210 or contact surface 220 of any other shape. Likewise, upper opening 240 and lower opening 245 shown as generally linear in FIGS. 7-9 for illustrative purposes, may be of any shape that will guide the machining tool to be used with tool guide 200 to the desired position and keep it in the desired orientation relative to the casting core. It should also be understood that positioning elements 250, 255 may be positioned at any location on body 210, including on contact surface 220, and in any orientation that allows tool guide 200 to engage with fixed portions of the casting core during machining and be removed afterwards.

As set out above regarding FIGS. 1-5, body 210 may be composed of one or more of a variety of materials, which may include, e.g., polymer resins, ceramics, or metals. In some embodiments, the material used to form body 210 may be at least partially transparent with the same advantages as set out previously.

A liner 270 may be included inside upper opening 240 and/or inside lower opening 245. Liner 270 protects the other components of tool guide 200 from abrasion or other damage from the tool bit during operation of the machining tool. Optional liner 270 may be shaped to conform to all or part of the passageway between upper opening 240 and lower opening 245, e.g., as a flattened racetrack oval ring, as a flattened conical frustum sleeve with a racetrack oval cross section, or as any other shape that protects body 210 against abrasion or other damage. Liner 270 may be composed of any material having a greater resistance to wear than other components of tool guide 200 which may come in contact with the tool bit, such as the body, upper opening, and lower opening. Materials that may be used for liner 270 include, e.g., polymer resins, ceramics, or metals.

Figure 10:
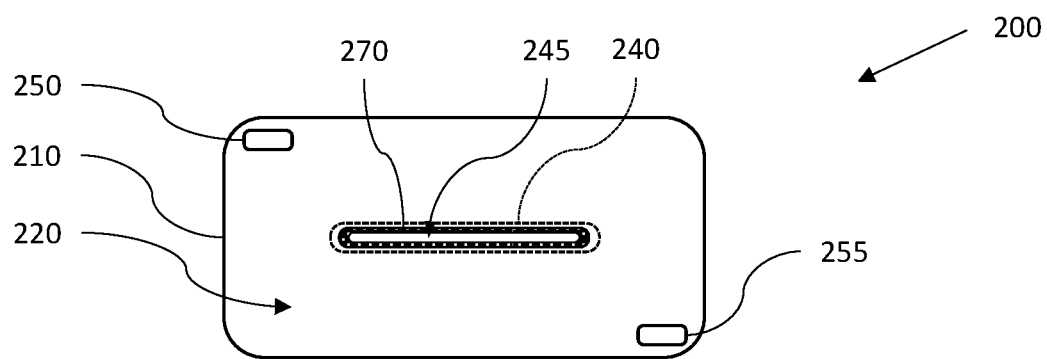
FIG. 10 shows a bottom view of a tool guide in according to embodiments of this disclosure.

FIG. 10 shows a bottom view of another embodiment according to this disclosure. Top and side views are omitted, as they would be similar to FIGS. 7 and 8. Here, tool guide 200 includes a body 210, contact surface 220, upper opening 240, lower opening 245, liner 270, and positioning elements 250, 255 located at alternate positions than shown in FIG. 9 relative to lower opening 245 and contact surface 220. As shown in FIG. 10, positioning elements 250, 255 may be placed at locations on contact surface 220 which are intended to engage different surface features, e.g., different slots, on the casting core.

Figure 11:
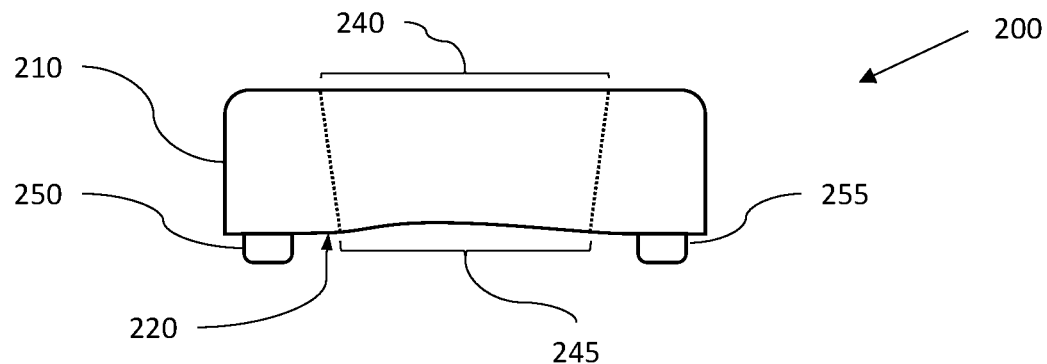
FIG. 11 shows a side elevation view of a tool guide in according to embodiments of this disclosure.
Figure 12:
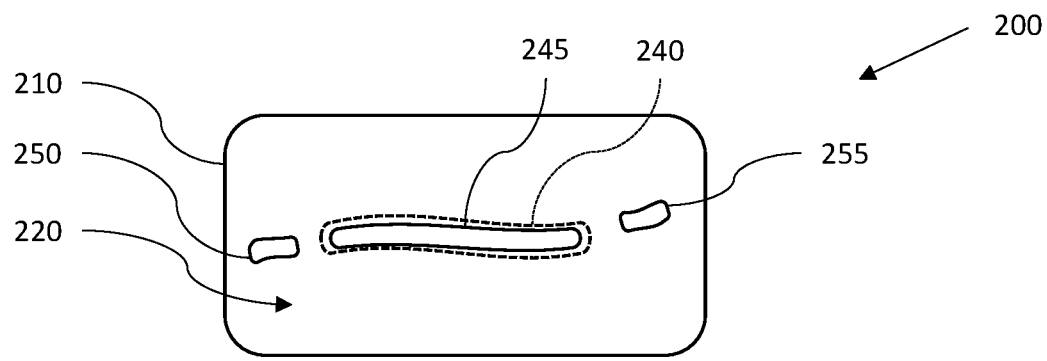
FIG. 12 shows a bottom view of the tool guide in FIG. 11 according to embodiments of this disclosure.

FIG. 11 and FIG. 12 together show two views of another embodiment according to this disclosure. FIG. 11 shows a side view of an example embodiment, and FIG. 12 shows a bottom view of the same embodiment. Tool guide 200 shown includes a body 210, contact surface 220, upper opening 240, lower opening 245, and positioning elements 250, 255. As shown in FIG. 11, contact surface 220 need not be planar, but may instead include one or more geometric elements, e.g., convex curvature, concave curvature, grooves, ridges, or other geometry complementary to the surface of a casting core. As shown in FIG. 12, positioning elements 250, 255 may have non-linear and/or non-regular shapes so as to engage complementary surface features, e.g., slots on the casting core. Likewise, upper opening 240 and lower opening 245 may have non-linear and/or non-regular shapes so as to provide protected access to temporary elements such as tie-bars located in non-linear and/or non-regular portions of the casting core.

Figure 13:
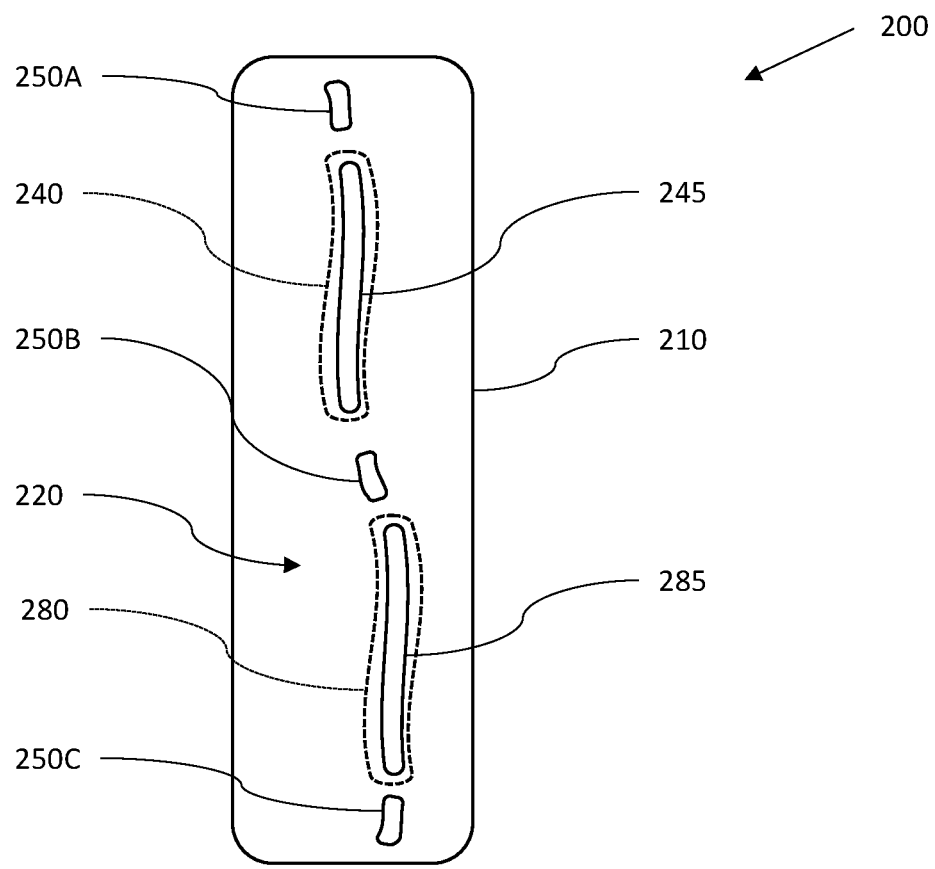
FIG. 13 shows a bottom view of a tool guide including multiple openings according to embodiments of this disclosure.
Figure 14:
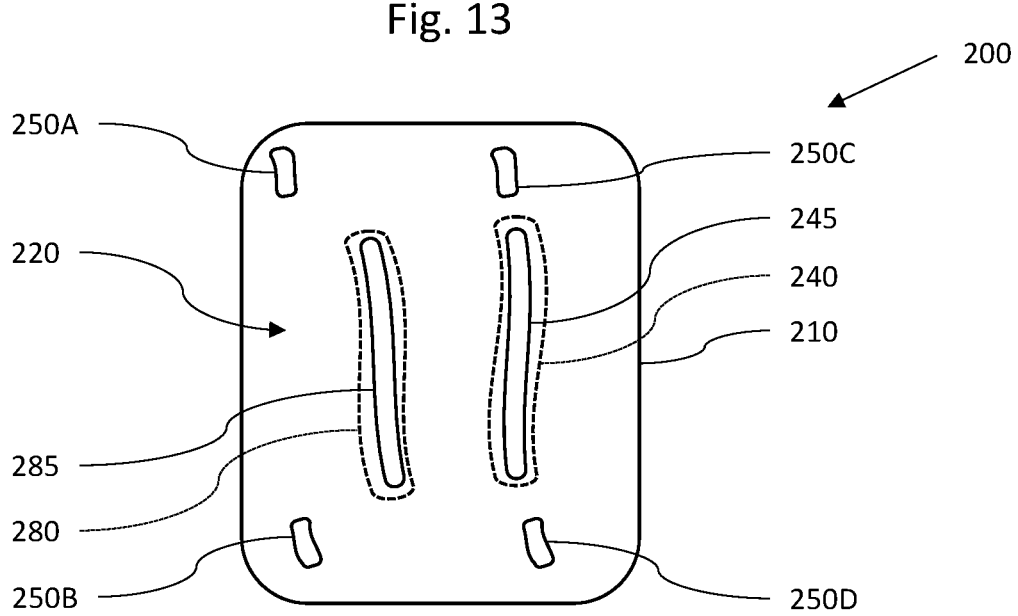
FIG. 14 shows a bottom view of a tool guide including multiple openings according to embodiments of this disclosure.

FIG. 13 shows a bottom view of another embodiment including multiple openings according to this disclosure. Here, tool guide 200 shown includes a body 210, contact surface 220, upper openings 240, 280, lower openings 245, 285, and positioning elements 250A-C. FIG. 14 shows a bottom view of another example embodiment including multiple openings according to this disclosure. Here, tool guide 200 includes a body 210, contact surface 220, upper openings 240, 280, lower openings 245, 285, and positioning elements 250A-D. Taken together, FIGS. 12 and 13 show that multiple openings 245, 285 and multiple positioning elements 250A-D may be included in a single tool guide 200. As set out above regarding FIG. 12, upper opening 240, lower opening 245, and positioning elements 250, 255 may have non-linear and/or non-regular shapes. As shown in FIG. 14, positioning elements 250A-D may also be placed at locations on contact surface 220 which are intended to engage different surface features, e.g., different slots, on the casting core.

Different portions of tool guide 200 may be combined into integral units. For example, body 210 and positioning element(s) 250, 255 may be manufactured as a single unit from the same material. Individual parts or all of tool guide 200 may be manufactured using additive manufacturing as set forth above. Additive manufacturing could facilitate customization of, e.g., contact surface 220 and/or positioning elements 250, 255 as desired.

Figure 15:
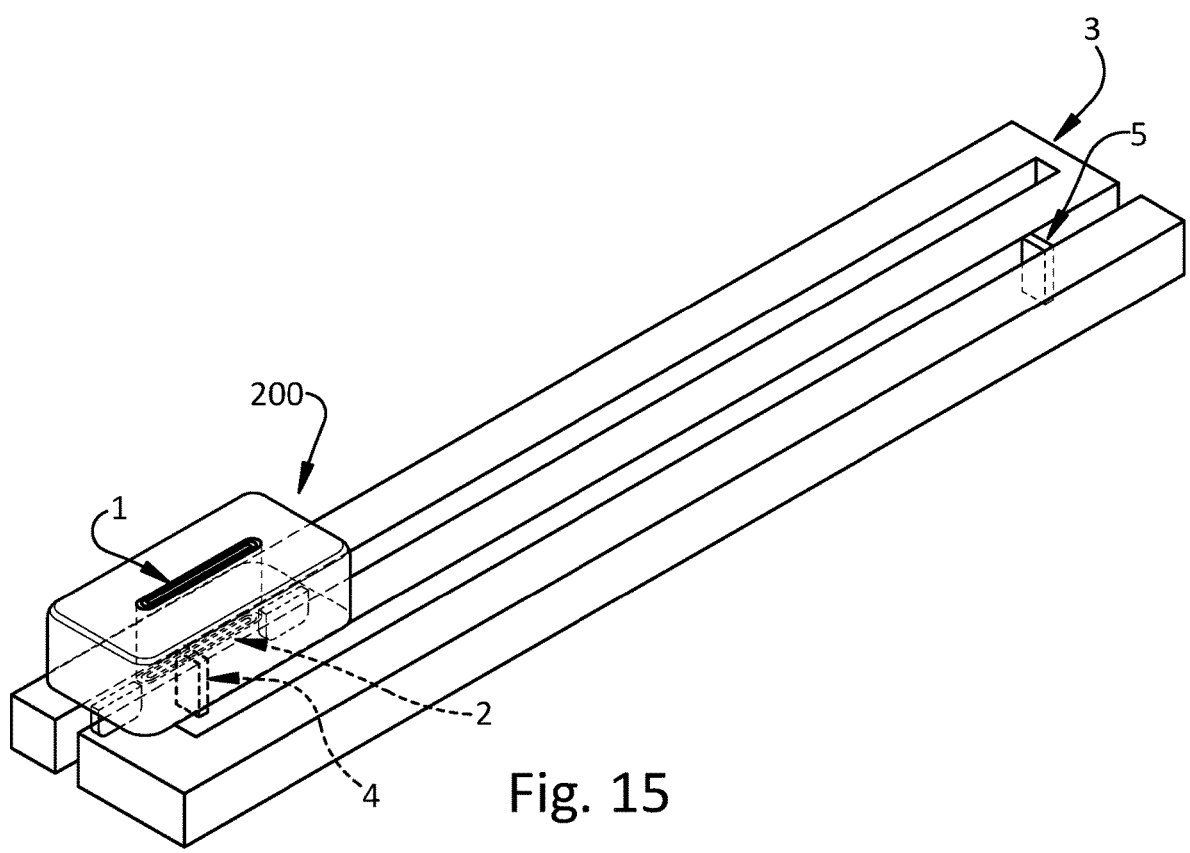
FIG. 15 shows a tool guide according to embodiments of this disclosure employed in conjunction with a machining tool and casting core.

FIG. 15 shows a tool guide 200 according to embodiments of this disclosure employed in conjunction with a machining tool 1, tool bit 2, and workpiece 3, e.g., a casting core. Tool guide 200 is seated on workpiece 3 at a predetermined location such that it can be removed after processing. Tool bit 2, attached to machining tool 1, may be operated though tool guide 200 to remove temporary tie bar 4. It will be apparent to those of ordinary skill in the art that tool guide 200 may be employed to aid in shaping many other workpieces without departing from the scope and spirit of the disclosure. It will therefore also be apparent to those of ordinary skill in the art that tool guide 200 may be employed in fabricating any casting core used in investment casting processes without departing from the scope and spirit of the disclosure, and that a turbomachine blade casting core is shown for purposes of illustration and description, but is not intended to be exhaustive or limiting to the disclosure in the form disclosed. Likewise, any number of additional temporary elements such as second tie bar 5 may be removed using embodiments of this disclosure. Tie bar 4 and second tie bar 5 are shown for purposes of illustration and description, but are not intended to be exhaustive or limiting to the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated surface features, integers, steps, operations, elements, and/or components, but do not preclude the presence or addition of one or more other surface features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). "Substantially" refers to largely, for the most part, entirely specified or any slight deviation which provides the same technical benefits of the disclosure.

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used throughout the descriptions presented herein and should generally be given the following meaning unless contradicted or elaborated upon by other descriptions set forth herein. Some of the terms set forth herein may be registered trademarks (®).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tool guide for a tool that shapes a workpiece, the tool guide comprising:
   a body having a contact surface configured to contact a surface of a workpiece;
   a tool holder positioned within the body and configured to hold a machining tool having a tool bit, wherein an orientation of the tool holder defines an axial orientation of the tool guide, and wherein the tool holder orients the machining tool in the axial direction relative to the workpiece;
   a guide element protruding axially outward from the contact surface to an end displaced from the contact surface, and directly attached to the body, the guide element being configured to slidably engage a surface feature of the workpiece;
   a bit guard protruding axially outward from the contact surface of the body to an end displaced from the guide element and the contact surface, such that the end of the guide element is located axially between the contact surface and the end of the bit guard; and
   an upper opening and a lower opening in the body configured to allow the tool bit to extend axially beyond the contact surface and operate to remove a portion of the workpiece.

2. The tool guide of claim 1, wherein the body includes a material which is at least partially transparent, and wherein the tool guide is configured to allow visual observation therethrough of the tool bit during operation of the machining tool.

3. The tool guide of claim 1, further comprising a second guide element attached to the body configured to slidably engage the surface feature of the workpiece, wherein the second guide element is orthogonal to the axial orientation and laterally displaced from the first guide element.

4. The tool guide of claim 1, wherein the contact surface and the guide element are each shaped to substantially conform to a predetermined portion of the workpiece.

5. The tool guide of claim 1, further comprising a bit guard at least partially enclosing the tool bit and attached to at least one of the guide element and the contact surface.

6. The tool guide of claim 5, further comprising a liner positioned within the bit guard wherein the liner includes a liner material having greater resistance to wear than the bit guard.

7. The tool guide of claim 5, wherein the bit guard and the guide element are integrally connected to one another.

8. The tool guide of claim 5, wherein the bit guard, the guide element, and the body are integrally connected to one another.

9. The tool guide of claim 1, wherein the body includes a polymer resin.

10. The tool guide of claim 1, wherein the tool guide is additively manufactured.

11. A tool guide for a tool that shapes a workpiece, the tool guide comprising:
   a body having a contact surface configured to contact a surface of a workpiece;
   an upper opening and a lower opening in the body configured to limit the movement of a machining tool having a tool bit to a predetermined area, and configured to allow the tool bit to extend beyond the contact surface and operate to remove a portion of the workpiece, wherein an orientation of the tool bit defines an axial orientation of the tool guide, the upper opening, and the lower opening have a curvilinear shape;
   a plurality of positioning elements protruding axially outward from the contact surface to an end displaced from the contact surface, and directly attached to the body, the plurality of positioning elements being configured to removably engage a surface feature of the workpiece; and
   a bit guard protruding axially outward from the contact surface of the body to an end displaced from the positioning element and the contact surface, such that the end of the positioning element is located axially between the contact surface and the end of the bit guard.

12. The tool guide of claim 11, wherein the body includes a material that is at least partially transparent, and wherein the tool guide is configured to allow visual observation of the tool bit there through during operation of the machining tool.

13. The tool guide of claim 11, further comprising a second plurality of positioning elements configured to engage the surface feature of the workpiece, wherein the second plurality of positioning elements are orthogonal to the axial orientation and laterally displaced with the first set.

14. The tool guide of claim 13, wherein the second positioning element engages a second surface feature of the workpiece.

15. The tool guide of claim 11, wherein the contact surface and the positioning element are each shaped to substantially conform to a predetermined portion of the workpiece.

16. The tool guide of claim 11, further comprising a liner positioned within the lower opening wherein the liner includes a liner material having greater resistance to wear than the body.

17. The tool guide of claim 11, further comprising a second upper opening and a second lower opening in the body configured to limit the movement of the machining tool having the tool bit to a second predetermined area and configured to allow the tool bit to extend beyond the contact surface and operate to remove a second portion of the workpiece.

18. A tool guide for a tool that shapes a workpiece, the tool guide comprising:
   a body having a contact surface configured to contact a surface of the workpiece;
   a first positioning element attached to the body configured to removably engage a slot within the workpiece, wherein the first positioning element engages at least one sidewall of the slot;
   a second positioning element attached to the body configured to removably engage the interior surface of the slot within the workpiece;
   a plurality of upper openings and a plurality of lower openings in the body configured to limit the movement of a machining tool having a tool bit to a predetermined area, and configured to allow the tool bit to extend beyond the contact surface and operate to remove a portion of the slot within the workpiece; and a liner positioned within the plurality of lower openings wherein the liner includes a liner material having greater resistance to wear than the body, wherein the contact surface, the first positioning element and the second positioning element are each shaped and arranged to substantially conform to the slot within the workpiece, and wherein the plurality of upper openings is axially non-aligned with plurality of lower openings.

19. The tool guide of claim 18, wherein the body, the first positioning element, and the second positioning element are integrally connected to one another.

20. The tool guide of claim 18, wherein the body, the first positioning element, and the second positioning element are each additively manufactured, wherein the body includes a polymer resin that is transparent.

* * * * *